United States Patent
To et al.

(10) Patent No.: US 7,982,437 B2
(45) Date of Patent: Jul. 19, 2011

(54) AUTOMOTIVE POWER SUPPLY SYSTEM AND METHOD OF OPERATING SAME

(75) Inventors: Viet Quoc To, West Bloomfield, MI (US); Joseph Stanek, Northville, MI (US); Bijal Patel, Concord, NC (US); Bruce Carvell Blakemore, Plymouth, MI (US); Philip Michael Gonzales, Dearborn, MI (US); Josephine S. Lee, Novi, MI (US)

(73) Assignee: Ford Motor Company, Dearborn, MI (US)

(*) Notice: Subject to any disclaimer, the term of this patent is extended or adjusted under 35 U.S.C. 154(b) by 704 days.

(21) Appl. No.: 12/115,856

(22) Filed: May 6, 2008

(65) Prior Publication Data

US 2009/0278500 A1 Nov. 12, 2009

(51) Int. Cl.
*H01M 10/44* (2006.01)
*H01M 10/46* (2006.01)

(52) U.S. Cl. .................................................. 320/150
(58) Field of Classification Search .............. 320/107, 320/112, 114, 125, 128, 150, 153; 429/96–100
See application file for complete search history.

(56) References Cited

U.S. PATENT DOCUMENTS

| | | | |
|---|---|---|---|
| 5,508,126 A * | 4/1996 | Braun | 429/7 |
| 6,002,240 A | 12/1999 | McMahan et al. | |
| 6,441,588 B1 | 8/2002 | Yagi et al. | |
| 6,501,250 B2 | 12/2002 | Bito et al. | |
| 6,946,818 B2 | 9/2005 | Cawthorne et al. | |
| 2004/0135552 A1 * | 7/2004 | Wolin et al. | 320/150 |

* cited by examiner

*Primary Examiner* — Edward Tso
(74) *Attorney, Agent, or Firm* — David B. Kelley; Brooks Kushman P.C.

(57) ABSTRACT

A battery control module monitors discharge voltages associated with a traction battery of an automotive vehicle. The battery control module cycles the traction battery at a discharge-voltage dependent charge/discharge profile to generate heat within the traction battery.

20 Claims, 3 Drawing Sheets

AUTOMOTIVE POWER SUPPLY SYSTEM AND METHOD OF OPERATING SAME

BACKGROUND

1. Field of the Invention

The invention relates to automotive power supply systems and methods of operating the same.

2. Discussion

Different techniques may be used to heat a battery. As an example, U.S. Pat. No. 7,234,552 Prema et al. discloses a method for heating a battery in a hybrid electric vehicle. The method includes determining a battery temperature and determining whether a tip-in event, a tip-out event, or a terminal voltage event has occurred. The polarity of the battery is reversed if the battery temperature is below a predetermined value and if a tip-in event, a tip-out event, or a terminal voltage event has occurred.

As another example, U.S. Pat. No. 6,441,588 Yagi et al. discloses a battery charging control method. The method includes executing a first pulsed charging and discharging operation when a battery temperature is lower than a first predetermined temperature. During the first pulsed charging and discharging operation, the amount of charging is equal to the amount of discharging. The method also includes switching from the first pulsed charging and discharging operation to a second pulsed charging and discharging operation when the battery temperature exceeds the first predetermined temperature. During the second pulsed charging and discharging operation, the amount of discharging is less than the amount of charging. When the battery temperature exceeds a second predetermined temperature, a normal charging operation is performed.

As yet another example, U.S. Pat. No. 6,002,240 McMahan et al. discloses a rechargeable battery pack that can sense when it is exposed to a harmful low temperature and cause a heating circuit to heat the battery pack so that it remains in a temperature regime compatible with normal operation.

SUMMARY

A method for generating heat within a high voltage electrochemical power storage unit for a vehicle includes cycling the power storage unit at a first charge/discharge profile, monitoring the discharge voltage of the power storage unit and cycling the power storage unit at a second charge/discharge profile if a change in the discharge voltage of the power storage unit exceeds a threshold thereby generating heat within the power storage unit.

A power supply system for a vehicle includes a power storage unit and a control module. The control module is configured to cycle the power storage unit at a first charge/discharge profile, to monitor a discharge voltage of the power storage unit and to cycle the power storage unit at a second charge/discharge profile if a change in the discharge voltage of the power storage unit exceeds a threshold in order to generate heat within the power storage unit.

A battery control system for a traction battery of an automotive vehicle includes a battery control module for monitoring a discharge voltage of the traction battery and for cycling the traction battery at a discharge-voltage dependent charge/discharge profile to generate heat within the traction battery.

While exemplary embodiments in accordance with the invention are illustrated and disclosed, such disclosure should not be construed to limit the claims. It is anticipated that various modifications and alternative designs may be made without departing from the scope of the invention.

DETAILED DESCRIPTION

Certain traction batteries for automotive vehicles have limited charging capabilities at low temperatures. For example, the ability of a lithium-ion battery to provide and receive charge at low temperatures may be limited by diffusive characteristics of its anodic electrolyte and ionic lithium. These limited diffusive characteristics may result in battery degradation. This is particularly true at low temperatures during battery charging, where exceeding anodic diffusion rates may lead to losses in capacity and power through a phenomenon commonly known as lithium plating. Other battery types may experience losses in capability due to poor ionic diffusion and increased cell impedance.

Figure 1:
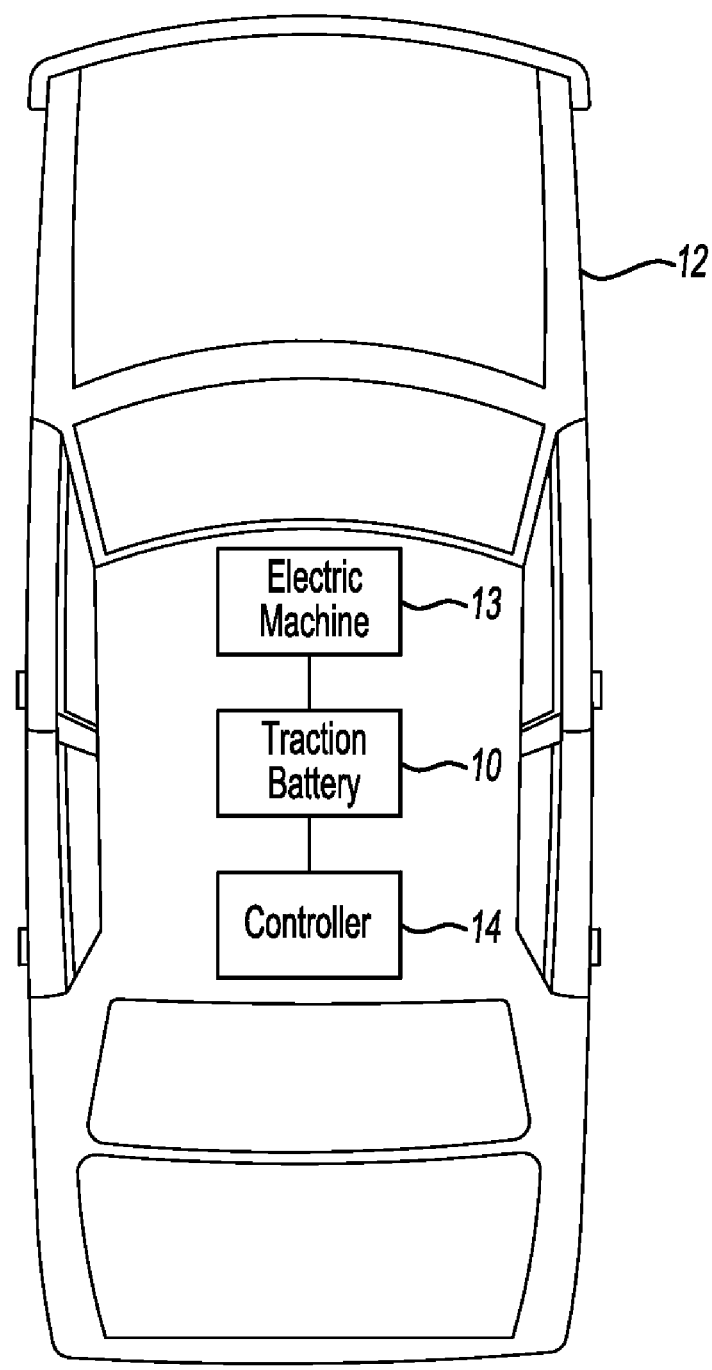
FIG. 1 is a block diagram of a portion of a power storage system of an automotive vehicle according to an embodiment of the invention.

Referring now to FIG. 1, a traction battery 10 of an automotive vehicle 12, e.g., hybrid electric vehicle, may include eighty-four, seven amp/hour lithium-ion power storage cells electrically arranged in series. In other embodiments, the traction battery 10 may include any number and/or type of storage cells. For example, the traction battery 10 may include one hundred, five amp/hour nickel metal hydride energy storage cells electrically arranged in parallel. As apparent to one of ordinary skill, the traction battery 10 may provide electrical power to an electric machine 13 that converts the electrical power to motive power for the automotive vehicle 12.

A battery controller 14 is operatively configured to monitor parameters associated with the traction battery 10 and to control the operation of the traction battery 10 based on these monitored parameters. In the embodiment of FIG. 1, the controller 14 determines an initial temperature associated with the traction battery 10. If the traction battery temperature is below a certain threshold, e.g., 10° C., the controller 14 will cycle the traction battery 10 to generate heat within the traction battery 10 during, for example, the early portion of vehicle operation in cold temperature conditions. The controller 14 also determines discharge voltages associated with the traction battery 10. A profile at which the traction battery 10 is cycled to generate heat may depend on the initial temperature or discharge voltages associated with the traction battery 10.

Figure 2:
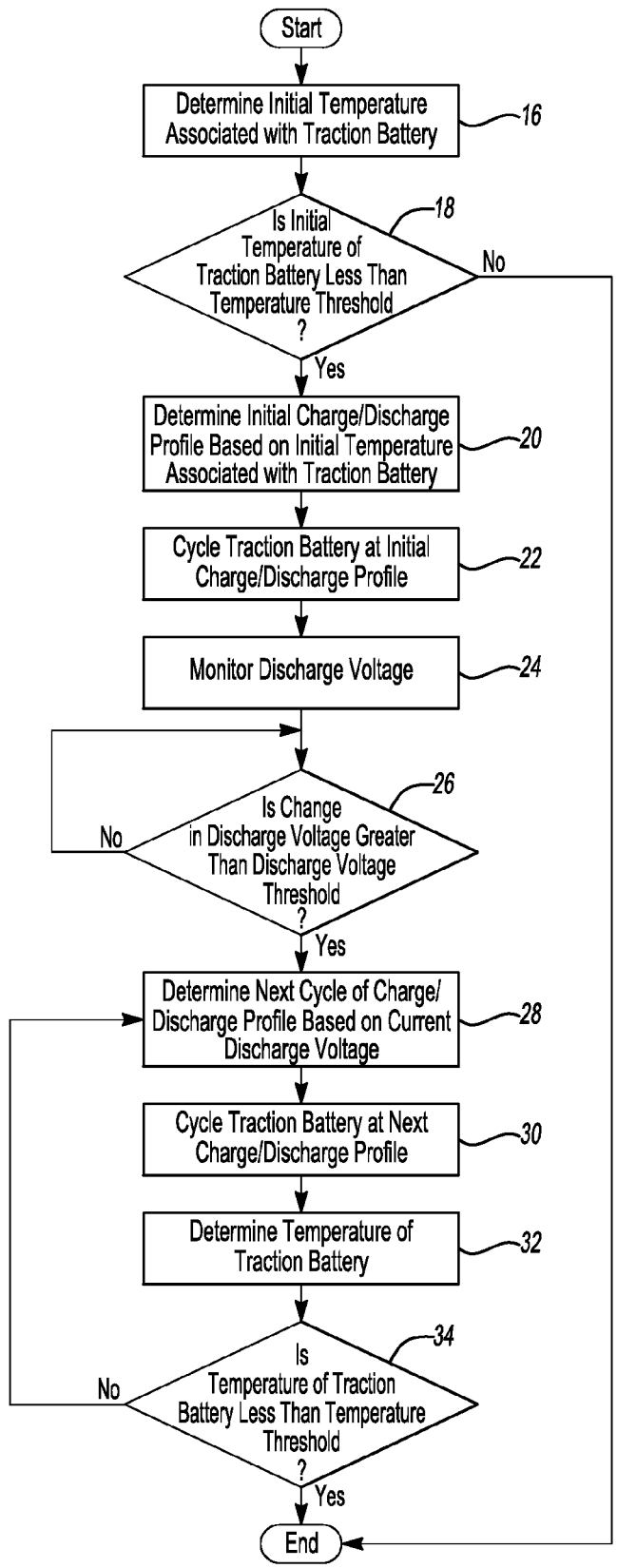
FIG. 2 is a flow chart depicting a strategy for controlling the power storage system of FIG. 1 according to an embodiment of the invention.

Referring now to FIGS. 1 and 2, the controller 14 determines an initial temperature associated with the traction battery 10 as indicated at 16. Any suitable method may be used to determine the initial temperature associated with the traction battery 10. For example, the initial temperature associated with the traction battery 10 may be measured via a temperature sensor (not shown) positioned in a vicinity of the traction battery 10. Individual cell temperatures may also be measured and averaged together. Other configurations are also possible.

As indicated at 18, the controller 14 determines if the initial temperature associated with the traction battery 10 is less than a temperature threshold, e.g., 12° C. If no, the strategy ends. If yes, the controller 14 determines an initial charge/discharge profile at which to cycle the traction battery 10 based on the initial temperature associated with the traction battery 10 as indicated at 20. For example, the controller 14 may access a look-up table, stored in memory, that maps initial traction battery temperatures with maximum charge and discharge current levels. These temperature based maximums may be established through characterization of the battery capability versus temperature. Any suitable technique, however, may be used.

As indicated at 22, the controller 14 cycles the traction battery 10 at the initial charge/discharge profile. As indicated at 24, the controller 14 monitors the discharge voltage associated with the traction battery 10 as the traction battery 10 is cycled. Any suitable method may be used to determine the discharge voltage associated with the traction battery 10. For example, the discharge voltage associated with the traction battery 10 may be sensed via circuitry configured to monitor voltage at the cell level of the traction battery 10.

As indicated at 26, the controller 14 determines if a change in the discharge voltage associated with the traction battery 10 is greater than a discharge voltage threshold. Any suitable technique may be used to determine the change in the discharge voltage. For example, the controller 14 may calculate a difference between an initial discharge voltage and a current discharge voltage associated with the traction battery 10. If no, the strategy repeats this step. If yes, the controller 14 determines a next charge/discharge profile at which to cycle the traction battery 10 based on a current discharge voltage associated with the traction battery 10 as indicated at 28. For example, the controller 14 may access a look-up table, stored in memory, that maps discharge voltages to maximum charge and discharge current levels. These discharge voltage based maximums may be established through characterization of battery capability versus temperature. Analytical or other suitable techniques, however, may also be used.

As indicated at 30, the controller 14 cycles the traction battery 10 at the next charge/discharge profile determined at 28. As indicated at 32, the controller 14 determines a current temperature associated with traction battery 10. As indicated at 34, the controller 14 determines if the current temperature associated with the traction battery 10 is less than the temperature threshold. If no, the strategy ends. If yes, the strategy returns to step 28.

Figure 3:
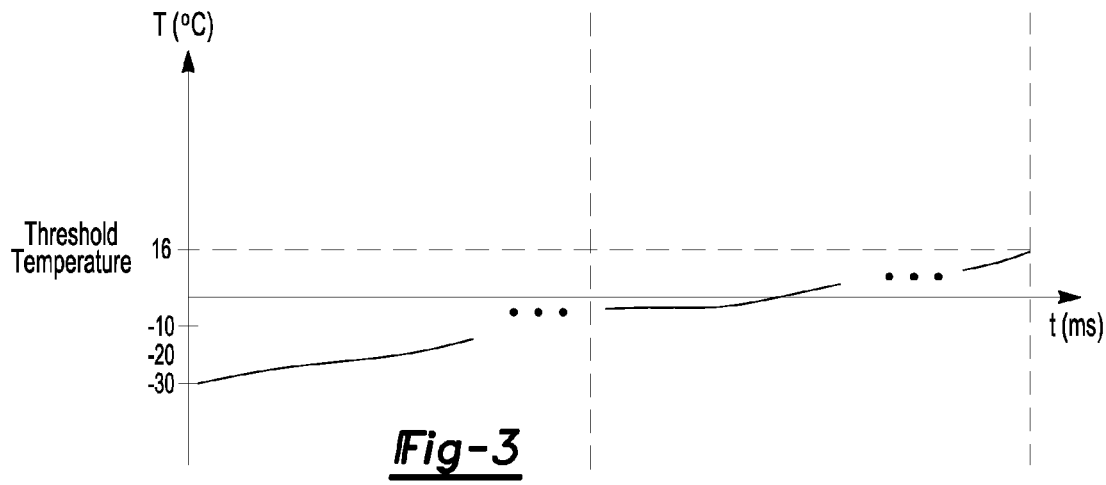
FIG. 3 is an exemplary plot of temperature versus time for the power storage system of FIG. 1.
Figure 4:
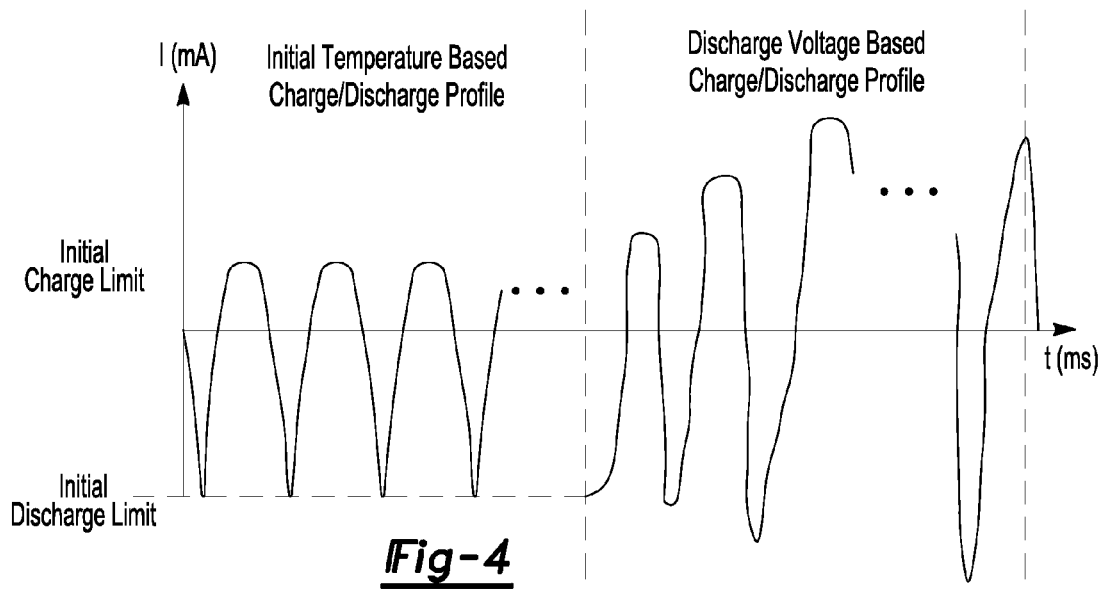
FIG. 4 is an exemplary plot of voltage versus time for the power storage system of FIG. 1.

Referring now to FIGS. 3 and 4, a temperature associated with a power storage unit is at −30° C. at time t =0, e.g., at vehicle start-up. A control module calculates maximum charge and discharge current limits for an initial charge/discharge profile based on this initial temperature.

The duration of the charging and discharging pulses is selected such that each charge/discharge cycle is charge neutral to the power storage unit. That is, the charge duration is determined by the amount of energy removed during the previous discharge step so that the charge replaces the energy removed.

As apparent to one of ordinary skill, the discharge pulses are defined by application requirements (for example acceleration assist) and limited by the battery's capabilities at the temperature of operation.

The maximum discharge current may be greater than the maximum charge current for power storage units, e.g., lithium-ion batteries, that generate more heat while discharging as compared to charging. To prevent the net charging of the power storage unit, the duration of the charging pulses is greater than the duration of the discharging pulses because the maximum charge current is less than the maximum discharge current. Other charge/discharge profiles, however, are also possible. For example, a maximum charge current for a nickel metal hydride battery may be greater than a maximum discharge current because the battery is at a low initial state of charge.

Figure 5:
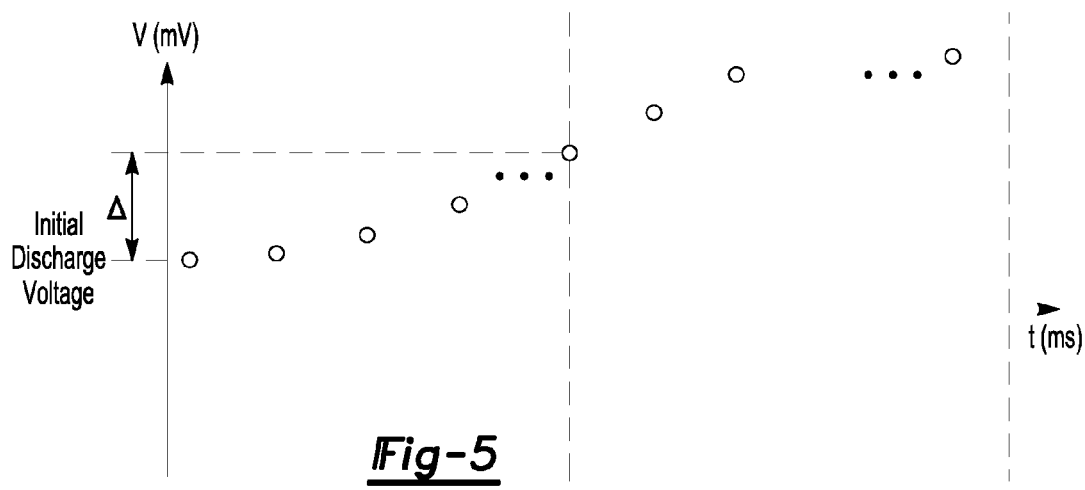
FIG. 5 is an exemplary plot of current versus time for the power storage system of FIG. 1.

Referring now to FIGS. 4 and 5, the control module monitors the discharge voltages associated with the maximum discharge currents as it cycles the power storage unit. Changes in discharge voltages may be indicative of a drop in internal resistance of the power storage unit and thus a rise in temperature associated with the power storage unit.

The control module calculates a difference, $\Delta$, between an initial discharge voltage and subsequent discharge voltages. When the difference, $\Delta$, exceeds a threshold, e.g., 10 mV, the control module dynamically alters the charge/discharge profile at which the power storage unit is cycled based on the discharge voltages. For example, the control unit may calculate the maximum charge and discharge current limits for each cycle of the charge/discharge profile based on a previous discharge voltage value. As the discharge voltage changes, the maximum charge and discharge current limits of the charge/discharge profile change. The duration of the charging and discharging pulses is selected such that each charge/discharge cycle is charge neutral to the power storage unit.

The control module continues to monitor the temperature of the power storage unit to determine when to discontinue the cycling of the power storage unit. As illustrated in FIGS. 3 and 4, when the temperature associated with the power storage unit exceeds 16° C., the control module discontinues the cycling of the power storage unit. Other arrangements and limits are of course also possible.

While embodiments of the invention have been illustrated and described, it is not intended that these embodiments illustrate and describe all possible forms of the invention. For example, the methods described herein may be performed at the cell, module or pack level.

The words used in the specification are words of description rather than limitation, and it is understood that various changes may be made without departing from the spirit and scope of the invention.

What is claimed:

1. A method for generating heat within a high voltage electrochemical power storage unit for a vehicle, the method comprising:
   cycling the power storage unit at a first charge/discharge profile;
   monitoring the discharge voltage of the power storage unit; and
   cycling the power storage unit at a second charge/discharge profile if a change in the discharge voltage of the power storage unit exceeds a threshold thereby generating heat within the power storage unit.

2. The method of claim 1 wherein the first charge/discharge profile is based on an initial temperature associated with the power storage unit.

3. The method of claim 2 wherein the first charge/discharge profile has a maximum discharge current based on the initial temperature.

4. The method of claim 1 wherein the second charge/discharge profile is discharge-voltage dependent.

5. The method of claim 1 wherein the first charge/discharge profile is charge neutral.

6. The method of claim 1 wherein the second charge/discharge profile is charge neutral.

7. A power supply system for a vehicle comprising:
a power storage unit; and
a control module being configured to cycle the power storage unit at a first charge/discharge profile, to monitor a discharge voltage of the power storage unit and to cycle the power storage unit at a second charge/discharge profile if a change in the discharge voltage of the power storage unit exceeds a threshold in order to generate heat within the power storage unit.

8. The system of claim 7 wherein the first charge/discharge profile is based on an initial temperature associated with the power storage unit.

9. The system of claim 8 wherein the first charge/discharge profile has a maximum discharge current based on the initial temperature.

10. The system of claim 7 wherein the second charge/discharge profile is discharge-voltage dependent.

11. The system of claim 7 wherein the first charge/discharge profile is charge neutral.

12. The system of claim 7 wherein the second charge/discharge profile is charge neutral.

13. A battery control system for a traction battery of an automotive vehicle comprising:
a battery control module being capable of monitoring a discharge voltage of the traction battery and of cycling the traction battery at a discharge-voltage dependent charge/discharge profile to generate heat within the traction battery.

14. The system of claim 13 wherein the battery control module is further capable of cycling the traction battery at another charge/discharge profile.

15. The system of claim 14 wherein the battery control module is further capable of determining a change in the discharge voltage of the traction battery.

16. The system of claim 15 wherein the battery control module is further capable of transitioning from the another charge/discharge profile to the discharge-voltage dependent charge/discharge profile if the change in the discharge voltage of the traction battery exceeds a threshold.

17. The system of claim 14 wherein the another charge/discharge profile is based on an initial temperature associated with the battery.

18. The system of claim 17 wherein the another charge/discharge profile has a maximum discharge current based on the initial temperature.

19. The system of claim 14 wherein the another charge/discharge profile is charge neutral.

20. The system of claim 13 wherein the discharge-voltage dependent charge/discharge profile is charge neutral.

* * * * *